(12) United States Patent
Zhou et al.

(10) Patent No.: US 10,611,028 B1
(45) Date of Patent: Apr. 7, 2020

(54) MAP BUILDING AND POSITIONING OF ROBOT

(71) Applicant: NEXTVPU (SHANGHAI) CO., LTD., Shanghai (CN)

(72) Inventors: Ji Zhou, Shanghai (CN); Xinpeng Feng, Shanghai (CN)

(73) Assignee: NEXTVPU (SHANGHAI) CO., LTD., Shanghai (CN)

( * ) Notice: Subject to any disclaimer, the term of this patent is extended or adjusted under 35 U.S.C. 154(b) by 0 days.

(21) Appl. No.: 16/396,616

(22) Filed: Apr. 26, 2019

Related U.S. Application Data

(63) Continuation of application No. PCT/CN2019/082290, filed on Apr. 11, 2019.

(30) Foreign Application Priority Data

Nov. 30, 2018 (CN) .......................... 2018 1 1463300

(51) Int. Cl.
B25J 9/16 (2006.01)
(52) U.S. Cl.
CPC ........... B25J 9/1666 (2013.01); B25J 9/1697 (2013.01)
(58) Field of Classification Search
CPC ............................. B25J 9/1666; B25J 9/1697
See application file for complete search history.

(56) References Cited

U.S. PATENT DOCUMENTS

| | | | |
|---|---|---|---|
| 5,677,836 A * | 10/1997 | Bauer | A47L 11/4011 701/23 |
| 8,185,239 B2 | 5/2012 | Teng et al. | |
| 2007/0293985 A1 | 12/2007 | Myeong et al. | |
| 2009/0182464 A1 * | 7/2009 | Myeong | G05D 1/0246 701/25 |
| 2010/0070078 A1 * | 3/2010 | Kong | G05D 1/0274 700/259 |

(Continued)

FOREIGN PATENT DOCUMENTS

| | | |
|---|---|---|
| CN | 103278170 A | 9/2013 |
| CN | 105973246 A | 9/2016 |

(Continued)

OTHER PUBLICATIONS

Tomono, Masahiro, "A 2-D Global Scan Matching Method using Euclidean Invariant Signature", Journal of the Robotics Society of Japan, vol. 25, No. 3, Apr. 2007, 30 pages (16 pages of English Translation and 14 pages of Original Document).

*Primary Examiner* — Stephen Holwerda
(74) *Attorney, Agent, or Firm* — Womble Bond Dickinson (US) LLP

(57) ABSTRACT

A robot, a map building method and a storage medium are provided. The map building method includes building an initial map according to a scene image captured by a robot in real time when the robot traverses a work area. The initial map includes a first map including a mapping of the work area and a map coordinate system, and a second map including a scene feature extracted based on the scene image, a geometric quantity of the scene feature and the scene image, which are stored in association with the pose of the robot in a scene database when capturing the scene image, the pose including a coordinate and an orientation of the robot, and the scene feature including a feature of a feature object in the scene and/or a feature of the scene image.

19 Claims, 9 Drawing Sheets

(56) References Cited

U.S. PATENT DOCUMENTS

| | | | | |
|---|---|---|---|---|
| 2016/0271795 | A1* | 9/2016 | Vicenti | ................... B25J 9/163 |
| 2017/0153647 | A1* | 6/2017 | Shin | ......................... B25J 13/08 |
| 2018/0039276 | A1 | 2/2018 | Keivan et al. | |

FOREIGN PATENT DOCUMENTS

| CN | 106863305 A | 6/2017 |
|---|---|---|
| CN | 108089585 A | 5/2018 |
| CN | 108225348 A | 6/2018 |
| CN | 108717710 A | 10/2018 |
| JP | 2017-093626 A | 5/2017 |
| JP | 2017-097538 A | 5/2017 |
| JP | 2017-198517 A | 11/2017 |
| JP | 2018-017900 A | 1/2018 |

\* cited by examiner

S110 — a robot traversing a work area according to a predetermined rule, and building an initial map according to an image captured by the robot in real time in the process of traverse, wherein the initial map comprises a first map including a mapping of the work area and a map coordinate system, and a second map including a scene feature extracted based on the captured scene image, a geometric quantity of the scene feature and the scene image from which the scene feature is extracted, which are stored in association with the pose of the robot when capturing the scene image.

FIG. 1

MAP BUILDING AND POSITIONING OF ROBOT

TECHNICAL FIELD

The present disclosure relates to the field of robot, and in particular, a robot and a map building method, a positioning method, an electronic equipment as well as a storage medium.

BACKGROUND ART

Currently, movable robots, such as sweeping robots, have been accepted and practically used by more and more families. Commonly-known robot positioning and map building both rely on active emission of signals, such as laser, infrared, etc., to detect the external environment to build a map. For example, some intelligent robots real-time positioning and map building technology are FastSLAM. FastSLAM is typically implemented using a laser rangefinder or sonar. Since FastSLAM uses sensors like a laser or sonar etc., a robot cannot identify in certain circumstances but can only estimate the whole environmental condition by prejudgment.

SUMMARY OF THE INVENTION

An object of the present disclosure is to provide a robot, a map building method and a storage medium.

According to an aspect of the present disclosure, there is provided a map building method of a robot, comprising: causing a robot to traverse a work area according to a predetermined rule, and building an initial map according to a scene image captured by the robot in real time in the process of traverse, wherein the initial map comprises a first map including a mapping of the work area and a map coordinate system, and a second map including a scene feature extracted based on the captured scene image, a geometric quantity of the scene feature and the scene image from which the scene feature is extracted, which are stored in association with the pose of the robot when capturing the scene image, the pose including a coordinate and an orientation of the robot in the first map, and the scene feature including a feature of a feature object in the scene and/or a feature of the scene image.

According to yet another aspect of the present disclosure, there is provided a robot, comprising:

a sensor configured at least to capture an image surrounding the robot in real time:

a motor configured to drive the robot to move;

a processor configured to cause the robot traverse a work area according to a predetermined rule, and to build an initial map according to a scene image captured by the robot in real time in the process of traverse, wherein the initial map includes a first map including a mapping of the work area and a map coordinate system, and a second map including a scene feature extracted based on the captured scene image, a geometric quantity of the scene feature and the scene image from which the scene feature is extracted, which are stored in association with the pose of the robot when capturing the scene image, the pose including a coordinate and an orientation of the robot in the first map, and the scene feature including a feature of a feature object in the scene and/or a feature of the scene image.

According to yet another aspect of the present disclosure, there is provided a storage medium which stores a computer program that performs the steps of the method as described above when executed by the processor.

BRIEF DESCRIPTION OF THE DRAWINGS

The above and other features and advantages of the present disclosure will become more apparent from the detailed description of the exemplary embodiments with reference to the accompanying drawings.

FIG. 1 shows a flowchart of a map building method of a robot according to an embodiment of the present disclosure.

DETAILED DESCRIPTION OF THE EMBODIMENTS

Figure 2:
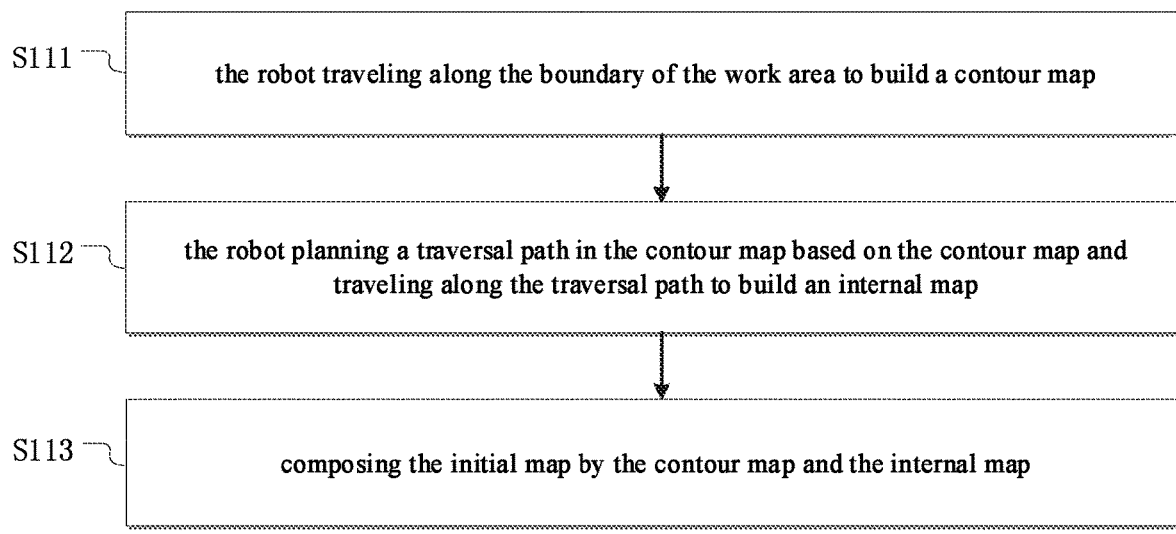
FIG. 2 shows a flowchart of a map building method of a robot according to an exemplary embodiment of the present disclosure.

Exemplary embodiments will be described more comprehensively with reference to the accompanying drawings. However, the exemplary embodiments can be implemented in a variety of forms and should not be construed as being limited to the examples set forth herein; rather, these embodiments are provided so that this disclosure will be more comprehensive and complete, and the idea of exemplary embodiments will be conveyed more thoroughly to those skilled in the art. The described features, structures, or characteristics may be combined in any suitable manner in one or more embodiments.

In addition, the drawings are merely schematic illustration of the present disclosure and are not necessarily drawn in proportion. The same reference numbers in the drawings denote the same or similar parts, and repeated description thereof will be omitted. Some of the block diagrams shown in the drawings are functional entities and do not necessarily have to correspond to physically or logically independent entities. These functional entities may be implemented in the form of software, or implemented in one or more hardware modules or integrated circuits, or implemented in different network and/or processor devices and/or microcontroller devices.

The positioning and map building methods of a robot in the related art cannot be applied in all environments, and because of high power consumption, high cost, and small amount of acquired information, the application of artificial intelligence on the robot is limited.

In order to overcome the shortcomings existing in the aforementioned related art, the present disclosure provides a robot and a map building method, a positioning method and a storage medium. Map building is implemented by a passive vision sensor without using an active signal. The visual sensor has low power consumption, low cost, and a large amount of acquired signals, thereby optimizing map building of the intelligent robot.

Referring first to FIG. 1, FIG. 1 shows a flowchart of a map building method of a robot according to an embodiment of the present disclosure.

FIG. 1 shows a step:

Step S110: a robot traversing a work area according to a predetermined rule, and building an initial map according to an scene image captured by the robot in real time in the process of traverse, wherein the initial map comprises a first map including a mapping of the work area and a map coordinate system, and a second map including a scene feature extracted based on the captured scene image, a geometric quantity of the scene feature and scene image extracting the scene feature which are stored in association with the pose of the robot when capturing the scene image. The pose includes a coordinate and an orientation of the robot in the first map, and the scene feature is a feature of a feature object in the scene and/or a feature of the scene image.

As compared with the prior art, the map building method of the robot provided in the present disclosure has the following advantages:

1) Map building is implemented by a passive vision sensor without an active signal. The visual sensor has low power consumption, low cost, and can acquire a large amount of signals, thereby optimizing the map building of the intelligent robot.

2) The method for building a map of the present disclosure builds an initial map including a first map and a second map, i.e. a scene map by which more information is provided for the robot.

In the embodiments of the present disclosure, the first map is used to describe a structure and a data structure of interrelationships between objects. The first map can plan a path for the robot. The first map uses a map coordinate system (MC) to represent a specific position in the work area. The map coordinate system (MC) may be a two-dimensional or three-dimensional coordinate system. The pose of the robot at a certain point in the first map may comprise the coordinate P of the point where the robot is located in the map coordinate system and its orientation r:

$$L = \begin{pmatrix} P \\ r \end{pmatrix}$$

where P is a vector whose dimension depends on the dimension of the map coordinate system, and r is a vector whose dimension is one less than P. For example, if the map coordinate system is a three-dimensional coordinate system, then P is a three-dimensional vector, and r is a two-dimensional vector: if the map coordinate system is a two-dimensional coordinate system, then P is a two-dimensional vector, and r is a one-dimensional vector.

The second map has a data structure of a scene and a geometric description at some specified positions on the basis of the first map. The second map can make the robot know its own location in the scene map at any time and may also help the robot update the content of the map. The second map may be represented as a mapping:

$$L = SM(I, G, S)$$

where L is a pose of the robot, I is an image shot by the robot at this pose, and I is also called a scene image in the present text, G and S represent the scene feature extracted from the scene image and the geometric quantity of the scene feature, respectively, and SM is a conversion function that converts the scene image, the scene feature, and the geometric quantity of the scene feature into the pose of the robot.

In some embodiments, the scene feature may be extracted according to the feature object in the image. The geometric quantity of the scene feature may be, for example, the geometric features of the points, lines, and surfaces of the feature object represented by the scene feature. The definition and the accuracy of the geometric quantity can vary according to different application requirements. In this embodiment, when the robot traverses the work area according to a predetermined rule, when the feature object in the work area is identified according to the captured image, the distance between the robot and the feature object is determined according to the map coordinate system of the first map. When the distance conforms to a predetermined distance, the image currently captured by the robot in real time is taken as a scene image, and the scene feature is extracted based on the scene image. According to an embodiment, the extracted scene feature is a fixed scene, and the feature object to be identified is usually a feature object having a fixed position in the work area. The feature object can be specified according to a preset set of feature objects. In some variations, the feature object may also be determined by machine learning based on images captured by multiple robots during operation, and the present disclosure is not limited thereto. Further, by means of the predetermined distance, the efficiency of feature extraction and the accuracy of feature extraction can be improved. The predetermined distance can be set in advance or changed depending on the working state of the robot. In other variations, the scene features are not limited to features of the feature object, but can also be features of the scene image. Different variations can be implemented by those skilled in the art, and will not be described herein.

Further, as described above, the coordinates and orientation of the robot in the first map are taken as the pose of the robot. The above step S110 of the robot traversing the working area according to a predetermined rule, and building an initial map according to the image captured by the robot in real time in the process of traverse may include the following steps: storing, in a scene database, the scene feature in the second map, the geometric quantity corresponding to the scene feature and a scene image from which the scene feature is extracted in association with the pose of the robot when capturing the scene image. The scene feature may comprise a feature of a feature object in the scene and/or a feature of the scene image, and therefore in the case that the scene feature comprises a feature of the feature object in the scene, the above-mentioned step is equivalent to storing, in a scene database, a feature object in the work area, which is identified according to the captured image, in association with a pose of the robot when capturing the image, so as to query the pose. In this embodiment, the scene database stores the mapping relationship of the pose of the robot when capturing the scene image (which may comprise, for example, the feature object) with the scene feature in the second map (which may comprise, for example, the feature of the feature object), the geometric quantity corresponding to the scene feature, and the scene image from which the scene feature is extracted. In other words, in this embodiment, the scene database is the second map described in step S110.

In an implementation of the above embodiment, the query of the pose includes matching the image feature (i.e. an example of the scene feature) of the image captured by the robot in real time with the scene feature stored in the scene database, and determining a difference between a real-time pose of the robot and the pose of the robot when capturing the scene image according to the comparison of the matched scene feature and the image feature (i.e. an example of the scene feature) of the image captured by the robot in real time, so as to determine the real-time pose of the robot based on the pose of the robot when capturing the scene image.

In other words, the relative position of the robot capturing the scene image and the robot capturing the real-time image are determined by the comparison of the scene feature and the image feature (i.e. an example of the scene feature) of the image captured by the robot in real time. Accordingly, the real-time pose of the robot can be determined based on the stored pose of the robot when capturing the scene image and the determined relative position. Further, the step of the aforementioned pose query may adopt an algorithm for determining an accurate pose in the map update described below in some exemplary implementations. The present disclosure is not limited thereto.

In the case that the above-mentioned scene feature comprises a feature of the feature object, the pose query comprises: matching a feature object in the image captured by the robot in real time with a feature object stored in the scene database, determining the difference between a real-time pose of the robot and the pose of the robot when capturing the feature object according to the comparison of the matched feature object and the feature object in the image captured by the robot in real time, thereby determining the real-time pose of the robot based on the pose of the robot stored in the scene database when capturing the feature object.

In other words, the relative position of the robot when capturing a feature object and the robot when capturing in real time the feature object are determined by the comparison of the feature object and the feature object in the image captured by the robot in real time. Therefore, the real-time pose of the robot can be determined according to the stored pose of the robot when capturing the feature object and the determined relative position. For example, the feature object, namely the charging pile for the robot, is used as the origin of the world coordinate system, and the pose of the robot in the initial map is inquired by identifying the charging pile in the image captured by the robot in real time.

The above content merely illustratively describe multiple implementations of the pose query of the present disclosure, and the present disclosure is not limited thereto.

The map building method of the robot provided by the present disclosure is further described below with reference to FIG. 2. FIG. 3 to FIG. 6. FIG. 2 shows a flowchart of a map building method of a robot according to an exemplary embodiment of the present disclosure. FIGS. 3-6 shows schematic diagrams illustrating a robot traversing a work area according to exemplary embodiments of the present disclosure.

As shown in FIG. 2, the step S110 of the robot traversing the work area according to a predetermined rule and building the initial map according to the image captured by the robot in real time in the process of traverse may include the following steps:

step S111: the robot 201 traveling along the boundary 211 of the work area 210 to build a contour map 221:

step S112: the robot 201 planning a traversal path within the contour map based on the contour map 221, and traveling along the traversal path within the contour map to build an internal map 222; and step S113: forming the initial map by the contour map 221 and the internal map 222.

Figure 3:
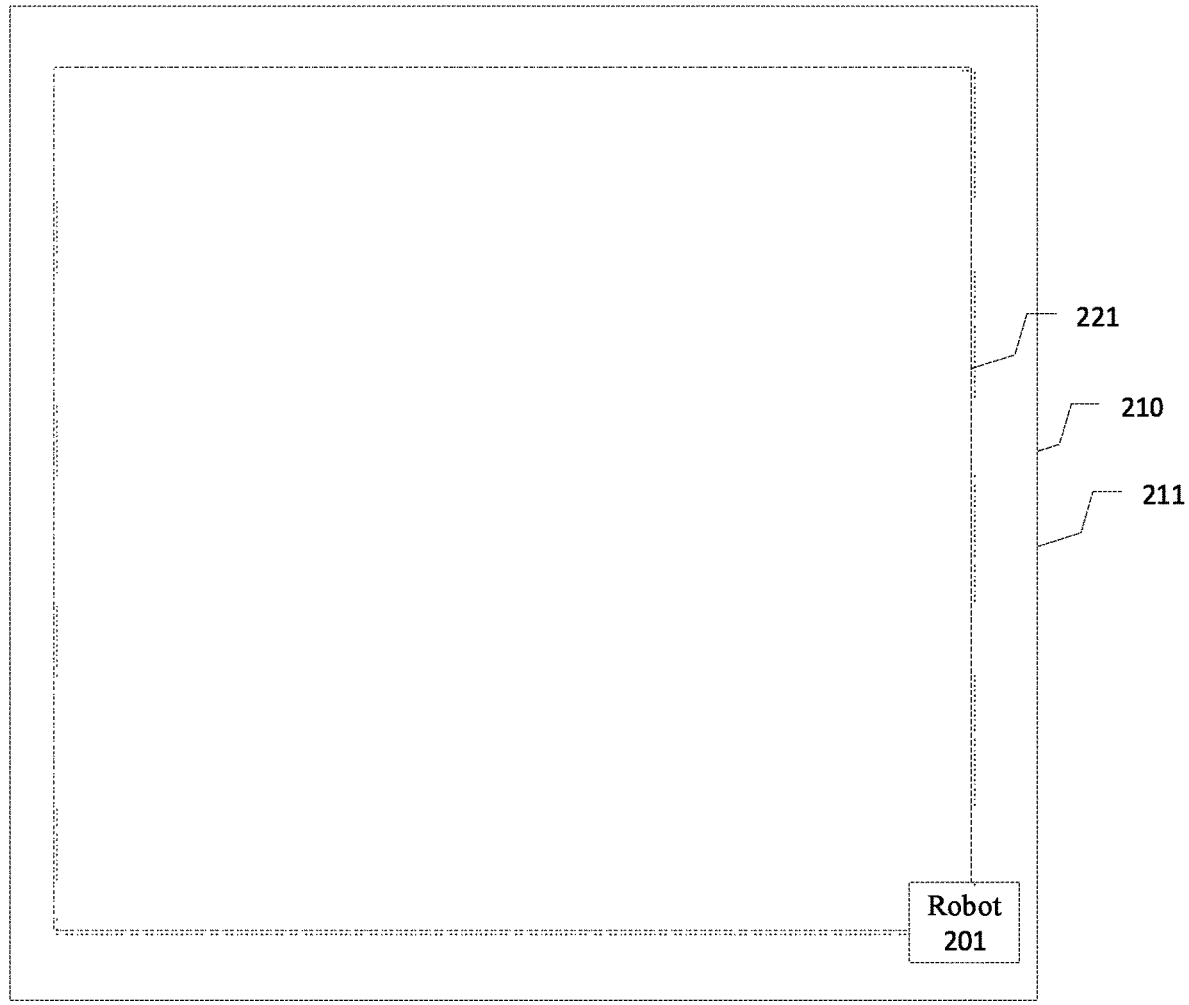
FIGS. 3-6 show schematic diagrams illustrating a robot traversing a work area according to exemplary embodiments of the present disclosure.
Figure 6:
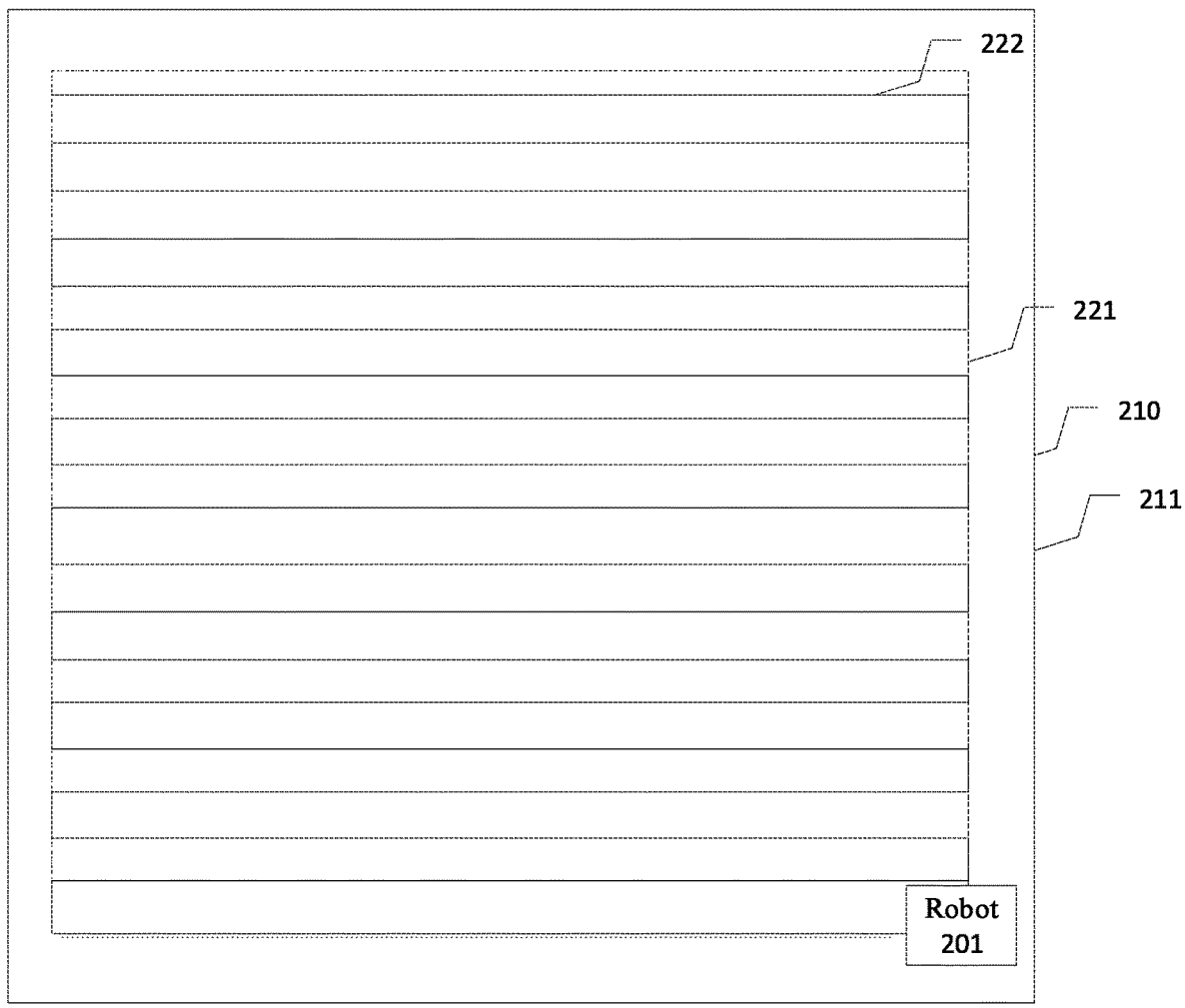

Regarding the above steps S111 to S113, reference is directed to FIG. 3 and FIG. 6. It should be noted that both the contour map 221 and the internal map 222 include a first map and a second map. The contour map 221 and the internal map 222 respectively represent region information and path information of the initial map. The first map and the second map respectively represent coordinate location parameters and corresponding scene feature information of the initial map.

Figure 4:
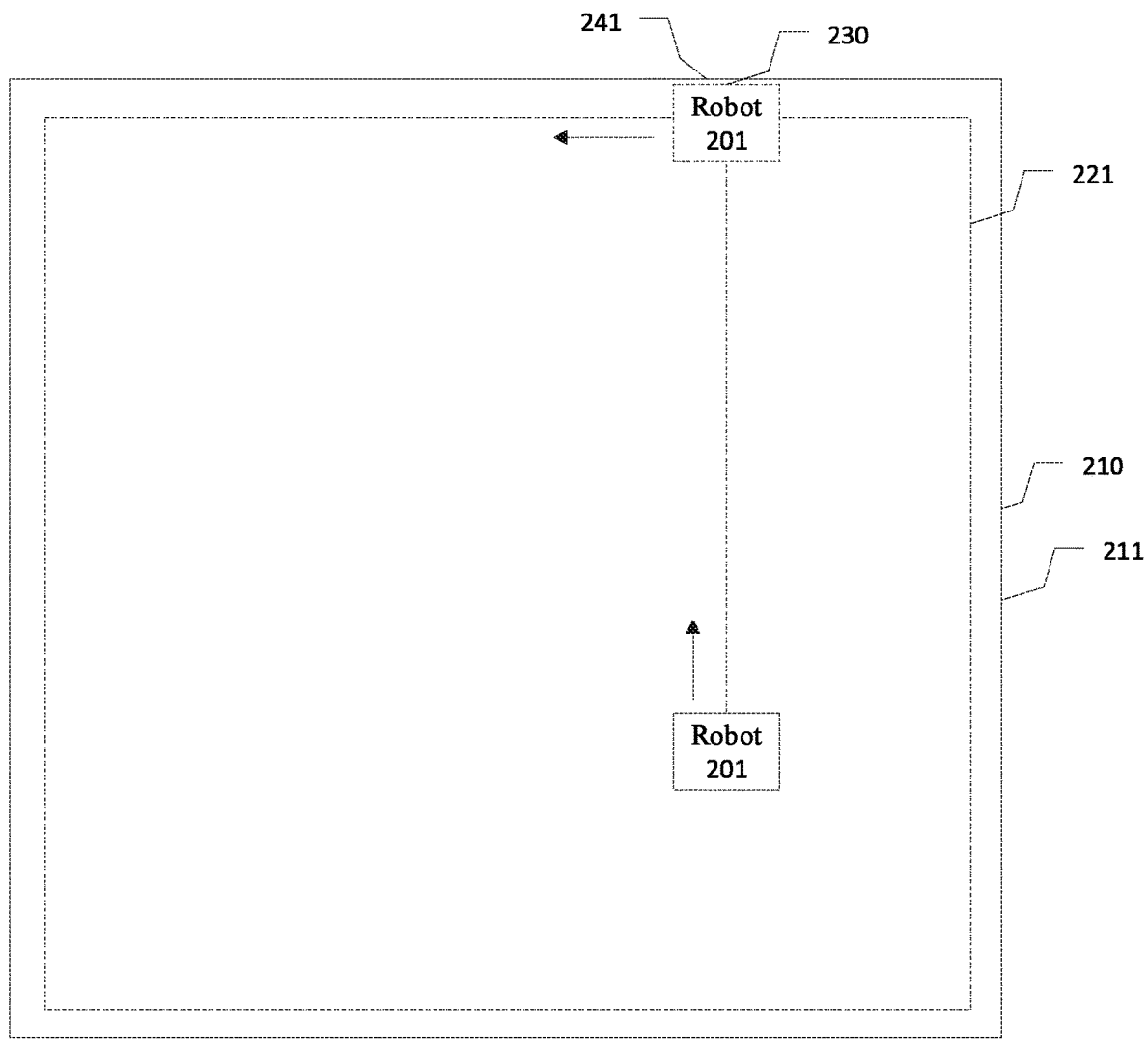

In an exemplary embodiment, the step S111 of the robot 201 traveling along the boundary 211 of the work area 210 to build the contour map 221 may further include the following steps: by taking the direction in which the robot 201 captures images as a positive direction, the robot 201 travels in the positive direction: when the robot 201 identifies an obstacle object, the robot 201 changes from traveling along the positive direction to traveling along the boundary of the obstacle object. The robot 201 identifies the obstacle object by, for example, image identification or data identification of other sensors, and the present disclosure is not limited thereto. As shown in FIG. 4, the robot 201 is located at any position within the work area, so that the robot 201 first travels in the positive direction (the direction in which the image is captured), and when the robot 201 hits the wall 241 (obstacle object), the robot 201 changes from traveling in the positive direction to traveling along the boundary of the wall 241 (obstacle object) to build a contour map 221. In this embodiment, traveling in the positive direction is changed to traveling along the boundary of the obstacle object, which makes the robot turn left with priority (in some variations, the robot can turn right).

In some exemplary embodiments, in the case that there is an obstacle in the work area, in the above steps, when the robot identifies the obstacle object, the current position of the robot 201 is determined as the first position 230, 231. The step of the robot 201 traveling along the boundary of the obstacle object further includes: when the robot travels to the first position 230, 231 again, the robot judges that the obstacle object is an obstacle 242 in the work area or the boundary of the work area (such as wall 241). If the obstacle object is the obstacle 242 in the work area, the robot 201 changes from traveling along the boundary of the obstacle object to traveling in the positive direction. If the obstacle object is a boundary of the work area (such as the wall 241), the robot 201 determines the boundary of the work area completely travelled.

Figure 5:
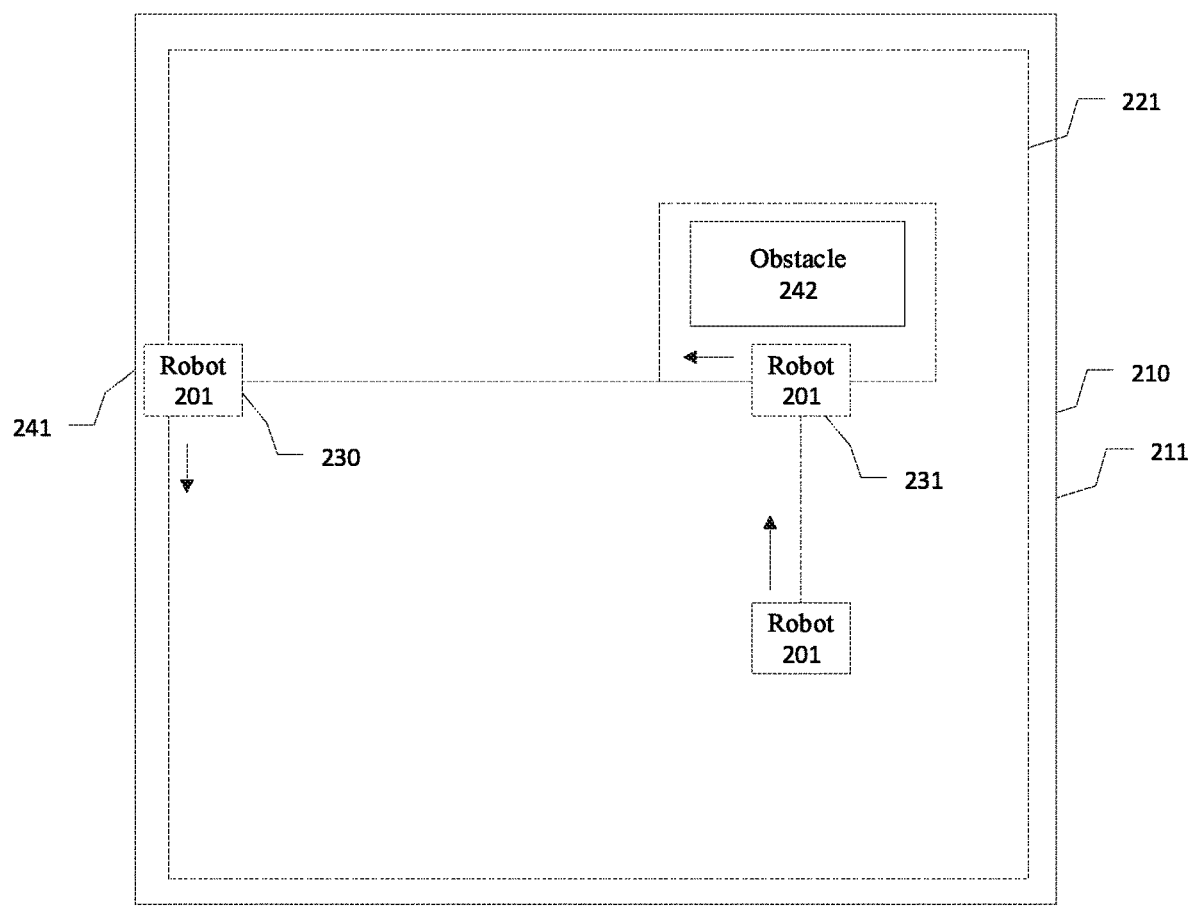

Regarding the above steps, reference is directed to FIG. 5. The robot 201 is initially located at any position within the work area. The robot 201 first travels in the positive direction (the direction in which the image is captured), and when the robot 201 hits the obstacle 242, the current position of the robot 201 is determined as the first position 231, and the robot 201 changes from traveling in the positive direction to traveling along the boundary of the obstacle 242 (i.e. traveling around the obstacle 242 once). When the robot travels to the first position 231 again after traveling around the obstacle 242 once, the robot determines that the obstacle object is the obstacle 242 in the work area, and then the robot 201 changes from traveling along the boundary of the obstacle object to traveling in the positive direction. On the other hand, when the robot 201 travels in the positive direction described above and encounters the boundary of the working area (such as the wall 241), the current position of the robot 201 is determined as the first position 230, and the robot 201 changes from traveling along the positive direction to traveling along the boundary of the work area (such as the wall 241) (i.e. traveling along the wall 241 once). When the robot travels to the first position 230 again after traveling along the wall 241 once, the robot judges that the obstacle object is a boundary of the work area (such as the wall 241), and the robot 201 determines the boundary of the work area is completely travelled. When there are multiple obstacles in the work area, the operation can also be performed according to the above steps so that the robot 201 travels along the boundary 211 of the work area 210.

By virtue of the above judgement, it can be ensured that the robot has traversed the boundary of the work area, without treating the obstacles within the work area as the boundary of the work area.

In some embodiments, the traveling path of the robot 201 in the above steps can be taken as the boundary 211 of the work area 210. In other embodiments, a partial path may be intercepted from the traveling path of the robot 201 in the above step as the boundary 211 of the work area 210. For example, only the mode that the robot 201 travels along the boundary of the obstacle object is retained, in which the traveling path of the robot 201 serves as the boundary 211 of the work area 210; or only the mode that the robot 201 travels along the wall 241 is retained, in which the traveling path of the robot 201 as the boundary 211 of the work area 210. The present disclosure can achieve more variations, which will not be described herein.

Figure 7:
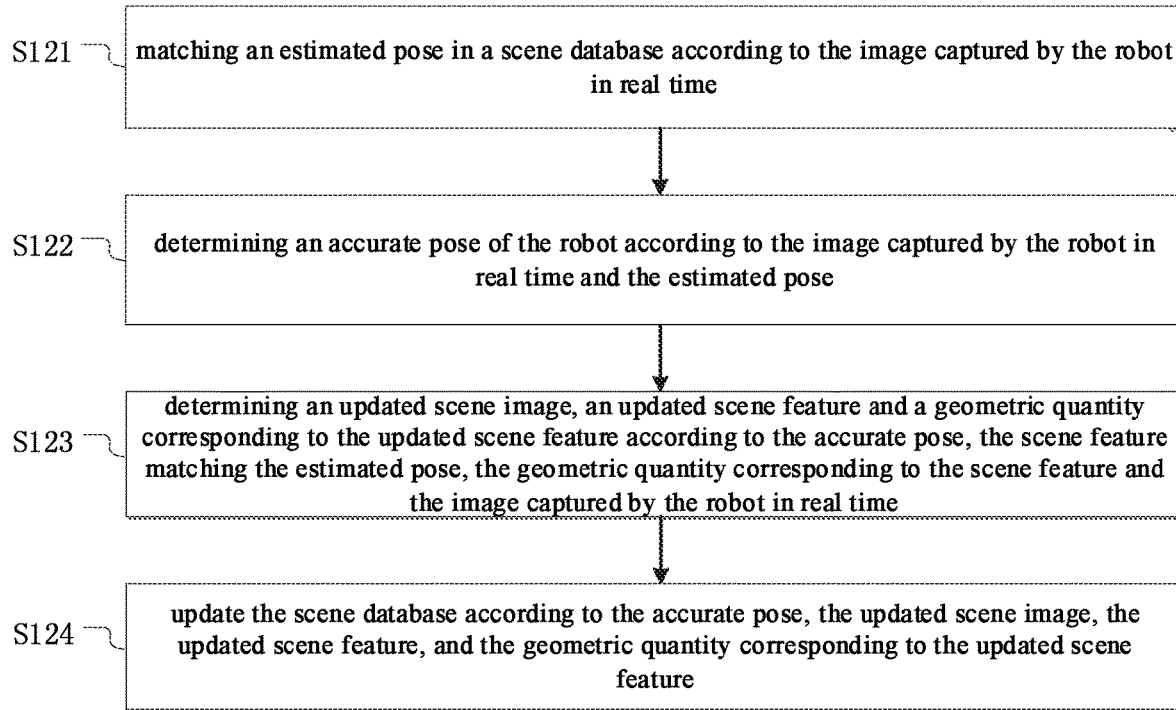
FIG. 7 shows a flowchart of iterative update of the map in accordance with an embodiment of the present disclosure.

Further, in the step S110, the robot traverses the working area according to a predetermined rule, and iteratively updating the initial map based on the image captured by the robot in real time when working in the work area is included after the step S110 of building the initial map according to the image captured by the robot in real time in the process of traverse. For the step of iteratively updating the initial map based on the image captured by the robot in real time when working in the work area, reference is directed to FIG. 7, which shows a flow chart of map iterative update according to an embodiment of the present disclosure. FIG. 7 shows four steps:

step S121: matching an estimated pose in the scene database according to the image captured by the robot in real time.

According to some embodiments, the above step can be expressed by the following formula:

$$\hat{L}=SM(1,G_t,S_t)$$

wherein the formula indicates that, given the image shot at time t (the image I captured by the robot in real time), the estimated pose $\hat{L}$ of the robot at time t is obtained based on the geometric information base $G_t$ composed by the geometric quantities of the corresponding scene features at time t (geometric description of feature point, line and face, etc. such as coordinates and formulae, etc.) and the scene database $S_t$ composed by the scene features. The process may include the following steps:

step 1: extracting a geometric feature set {F} from an image I;

step 2: using the set to search for the image index (k) that best matches I in $S_t$;

step 3: solving the following expectation according to the geometric feature subset $\{g\}_k$ corresponding to each k in $G_t$:

$$\hat{L}=MI(\{F\},\{g\}_k,L_k)$$

where MI represents an interpolation function on the Lie algebra SE(3), and $L_k$ is a pose of the robot corresponding to the image index k in $G_t$.

Step S122: determining an accurate pose of the robot according to the image captured by the robot in real time and the estimated pose.

According to some embodiments, the above step can be expressed by the following formula:

$$L=VSLAM\_LITE(\hat{L})$$

In this step, a more accurate pose may be obtained by using the lightweight VSLAM algorithm. Since $\hat{L}$ has already been a good estimate of L, the noise reduction processing can be performed on the aforementioned geometric feature set {F} by using $\hat{L}$. Specifically, the geometric feature $F_f$ that satisfies the following condition is marked as "error":

$$\{f,\ |E(M(F_f)-M(\hat{F}(I,\hat{L})))>th\}$$

where E is an error measurement function, such as Euclidean distance; M is a mapping relationship for mapping geometric features to another space, such as a projection transformation: $\hat{F}$ is a function for estimating the geometric features from the current estimated pose $\hat{L}$ and image, such as back projection: th is a predetermined threshold.

Once the features of "error" are removed, other high-quality geometric features allow us to use the simpler SLAM algorithm to obtain a more accurate pose L of the robot.

Step S123: determining the updated scene image, the updated scene feature and the geometric quantity corresponding to the updated scene feature according to the accurate pose, the scene feature matching the estimated pose, the geometric quantity corresponding to the scene feature and the image captured by the robot in real time.

According to some embodiments, the above step can be expressed by the following formula:

$$[G_t,S_{t+1}]=F(L,G_t,S_t,I)$$

In this step, the geometric information base $G_t$ and the scene database $S_t$ are updated from the robot pose L and the captured image I, thereby obtaining updated $G_{t+1}$ and $S_{t+1}$. Further, the captured image I may directly replace the scene image.

Step S124: updating the scene database according to the accurate pose, the updated scene image, the updated scene feature, and the geometric quantity corresponding to the updated scene feature.

By use of the workflow described with reference to FIG. 7, thanks to the image captured in real time by the robot while working, the initial map including the first map and the second map can be iteratively updated. The scene feature extracted based on the captured image and the geometric quantity of the scene feature included in the second map, and the image captured in real time while the robot is working, can both provide more and more information for the working robot, thereby making the noise in the process of building map less and less, which solves the problem of noise of map building achieved by the passive vision sensor, so that the accuracy of map building in the present disclosure is not worse than the accuracy of map building of an active signal. In addition, the initial map can be iteratively updated by means of the images captured by the robot while working, so that the robot can constantly get familiar with the environment, optimize the map for locating, and continuously detect environmental changes while working, which makes the robot more intelligent.

The above merely illustratively describes a plurality of embodiments provided by the present disclosure, and the present disclosure is not limited thereto.

Figure 8:
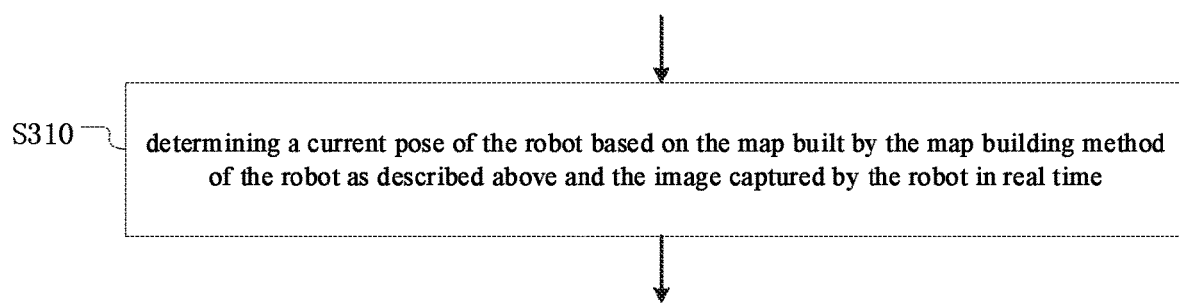
FIG. 8 shows a flowchart of a positioning method of a robot according to an embodiment of the present disclosure.

The present disclosure also provides a robot positioning method as shown in FIG. 8. FIG. 8 shows a flowchart illustrating a robot positioning method according to an embodiment of the present disclosure.

FIG. 8 shows one step:

step S310: determining the current pose of the robot based on the map built by the map building method of the robot as described above and the image captured by the robot in real time.

For example, the determination of the pose of step S310 may be consistent with the pose query as described above.

Figure 9:
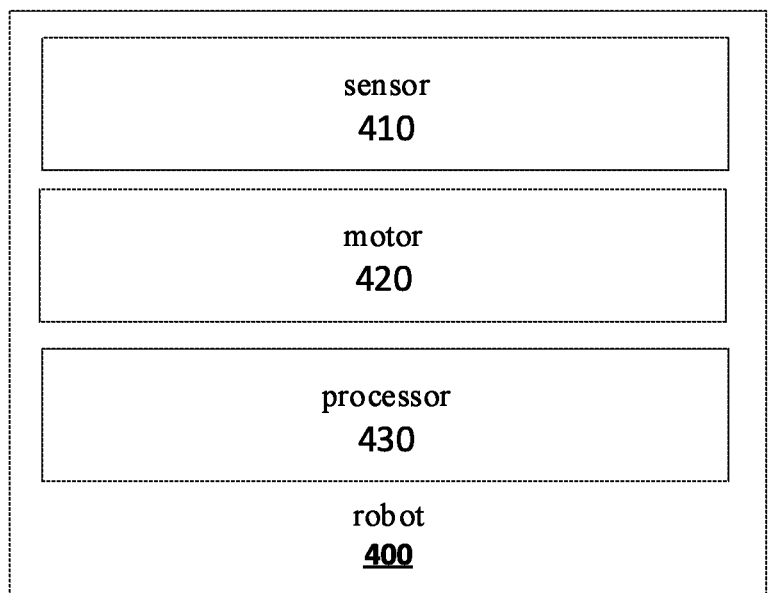
FIG. 9 shows a module diagram of a robot in accordance with an embodiment of the present disclosure.

The present disclosure also provides a robot. Referring now to FIG. 9, FIG. 9 illustrates a block diagram of a robot in accordance with an embodiment of the present disclosure. The robot 400 includes a sensor 410, a motor 420 and a processor 430.

The sensor 410 is configured at least to capture the images surrounding the robot in real time:

the motor 320 is configured to drive the robot to move;

The processor 430 is configured to make the robot to traverse a work area according to a predetermined rule, and to build an initial map according to a scene image captured by the robot in real time in the process of traverse, wherein the initial map comprises a first map including a mapping of the work area and a map coordinate system, and a second map including a scene feature extracted based on the captured scene image, a geometric quantity of the scene feature and a scene image from which the scene feature is extracted, which are stored in association with the pose of the robot when capturing the scene image. The pose comprises a coordinate and an orientation of the robot in the first map, and the scene feature is a feature of a feature object in the scene and/or a feature of the scene image.

In an exemplary embodiment, the processor 430 is further configured to iteratively update the initial map based on the image captured by the robot in real time while working in the work area.

In an exemplary embodiment, the processor 430 is further configured to determine a current pose of the robot according to the initial map or the updated map and the image captured by the robot in real time.

In an exemplary embodiment, the robot 400 may be a sweeping robot or a mopping robot, or any other robot that needs to travel in a limited space.

In the above description of the disclosure, although the initial map has been described to comprise a first map including a mapping of the work area and a map coordinate system, and a second map including a scene feature extracted based on the captured image, a geometric quantity of the scene feature and a scene image extracting the scene feature, it should be appreciated that the first map and the second map do not have to be created and stored as two separate maps, but the first map and the second map can be created and stored in a same map. As long as the initial map includes a mapping between the work area and the map coordinate system as well as a scene feature extracted based on the captured image and a geometric quantity of the scene feature, it should be deemed that the initial map includes the first map and the second map.

In the exemplary embodiment of the present disclosure, there is further provided a computer readable storage medium on which a computer program is stored, wherein the program, for example when being executed by the processor, may implement the map building method of a robot in any embodiment above. In some possible embodiments, various aspects of the present disclosure may be further implemented in the form of a program product, comprising program codes: when the program product is executed on a terminal equipment, the program codes are configured to cause the terminal equipment to execute the steps according to various exemplary embodiments of the present disclosure described in the map building method of a robot in the description.

Figure 10:
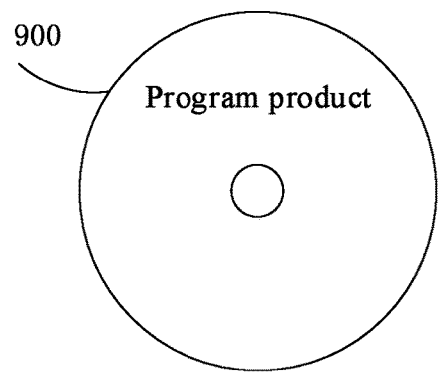
FIG. 10 illustratively shows a schematic diagram of a computer readable storage medium in an exemplary embodiment of the present disclosure.

Referring to FIG. 10, a program product 900) for implementing the method above according to the embodiments of the present disclosure is described. The program product 900 may adopt a portable compact disk read-only memory (CD-ROM) and comprise program codes, and may be run on a terminal equipment, for example, a personal computer. However, the program product of the present disclosure is not limited thereto. In the present disclosure, the readable storage medium may be any tangible medium containing or storing the program that may be used by an instruction executing system, device, or member or combination thereof.

The program product may adopt any combination of one or more readable mediums. The readable medium may be a readable signal medium or a readable storage medium. The readable storage medium, for example, may be, but is not limited to, an electrical, magnetic, optical, electromagnetic, infrared, or semiconductor system, device, or member, or any combination thereof. More specific examples (a non-exhaustive list) of the readable storage medium may include an electrical connection having one or more wires, a portable disk, a hard disk, a random access memory (RAM), a read-only memory (ROM), an erasable programmable read-only memory (EPROM or flash memory), an optical fiber, a portable compact disk read-only memory (CD-ROM), an optical memory member, a magnetic memory member, or any appropriate combination thereof.

The computer-readable storage medium may include a data signal propagated in a baseband or as part of a carrier wave, in which readable program codes are carried. A data signal propagated in such a way may adopt a plurality of forms, including, but not limited to, an electromagnetic signal, an optical signal, or any appropriate combination thereof. The readable storage medium may also be any readable medium other than the readable storage medium, which readable medium may send, propagate or transmit the programs used by the instruction executing system, device, member, or combination thereof. The program codes included in the readable storage medium may be transmitted using any appropriate medium, including, but not limited to: wireless, wired, cable, RF, etc., or any appropriate combination thereof.

Program codes for carrying out operations of the present disclosure may be compiled in any combination of one or more programming languages including object-oriented programming languages such as Java, C++ or the like, as well as conventional procedural programming languages, such as the "C" language or similar programming languages. The program codes may be entirely executed on a tenant's computing equipment, partially executed on the tenant's equipment, executed as a stand-alone software package, partially executed on the tenant's computing equipment and partially executed on a remote computing equipment, or entirely executed on the remote computing equipment or server. In a scenario involving a remote computing equipment, the remote computing equipment may be connected to the tenant's computing equipment through any type of network, including a local area network (LAN) or a wide area network (WAN), or connected to an external computing equipment (for example, connected through the Internet using an Internet Service Provider).

In an exemplary embodiment of the present disclosure, there is further provided an electronic equipment, which may comprise a processor (for example, the aforementioned processor 430) and a memory for storing an executable instruction of the processor. Wherein, the processor is configured to perform the steps of the map building method of a robot in any one of above embodiments by executing the executable instruction.

Those skilled in the art could understand that various aspects of the present disclosure may be implemented as a system, a method or a program product. Therefore, for example, various aspects of the present disclosure may be implemented in the following forms: complete hardware, complete software (including firmware and microcode, etc.), or a combination of hardware and software, which may be generally referred to as "a circuit," "a module," or "a system."

Hereinafter, referring to FIG. 11, an electronic equipment 1000 according to such an embodiment of the present disclosure will be described. The electronic equipment 1000 shown in FIG. 11 is only an example, which should not constitute any limitation to the function and use scope of the embodiments of the present disclosure.

Figure 11:
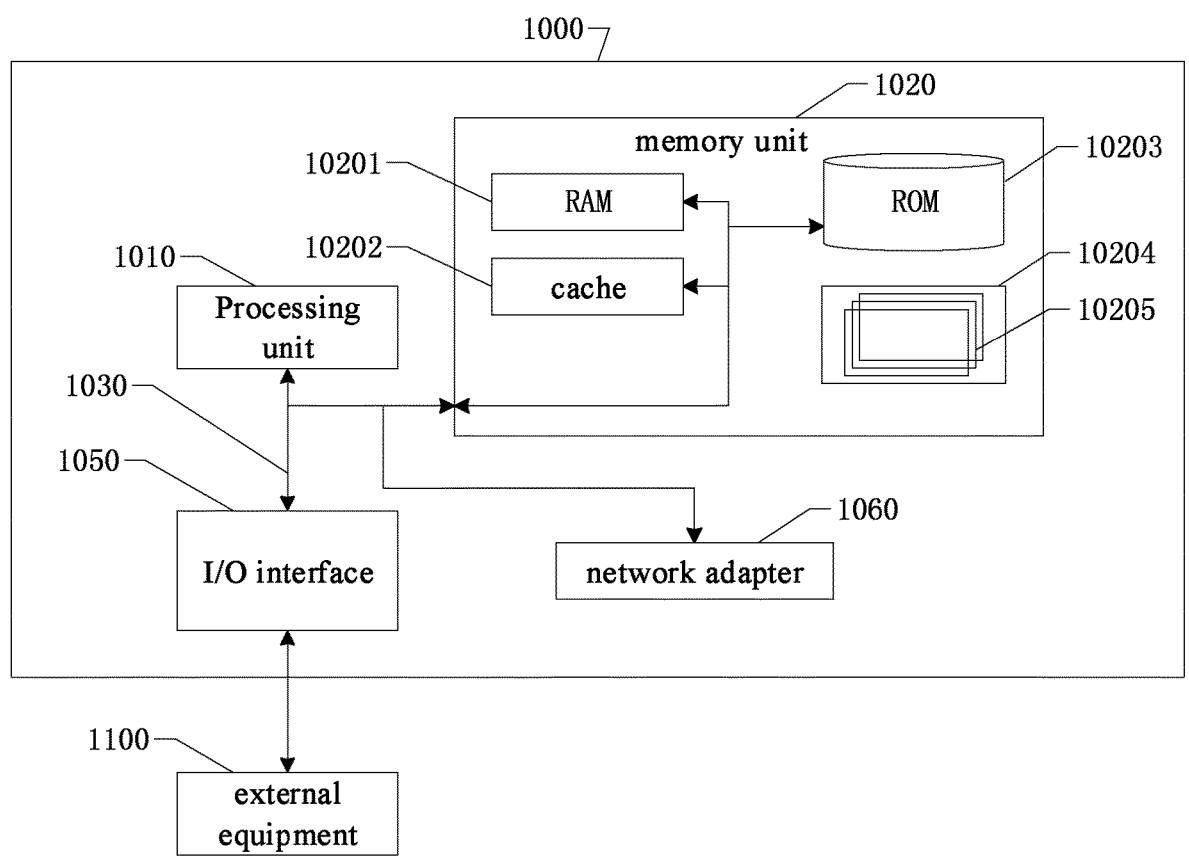
FIG. 11 illustratively shows a schematic diagram of an electronic equipment in an exemplary embodiment of the present disclosure.

As shown in FIG. 11, the electronic equipment 1000 is represented in the form of a general computing equipment. Components of the electronic equipment 10(X) may comprise, but is not limited to: at least one processing unit 1010, at least one memory unit 1020, and a bus 1030 connecting different system components (including the memory unit 1020 and the processing unit 1010 (for example, the aforementioned processor 430)) etc.

Wherein, the memory unit stores program codes which may be executed by the processing unit 1010, causing the processing unit 1010 to perform the steps according to various exemplary embodiments of the present disclosure described in the map building method of a robot in the description. For example, the processing unit 1010 may perform the steps as shown in FIG. 1.

The memory unit 1020 may comprise a readable medium in the form of a volatile memory unit, e.g. a random-access memory unit (RAM) 10201 and/or a cache memory unit 10202, and may further comprise a read-only memory unit (ROM) 10203.

The memory unit 1020 may further comprise a program/practical tool 10204 having a set (at least one) of program modules 10205. Such a program module 10205 includes, but is not limited to: an operating system, one or more application programs, other program modules and program data, wherein each or a certain combination in these examples may include implementation of a network environment.

The bus 1030 may represent one or more of several bus structures, including a memory unit bus or a memory unit controller, a peripheral bus, a graphical acceleration port, a processing unit, or a local area bus using any bus structure(s) in a plurality of bus structures.

The electronic equipment 1000 may also communicate with one or more external equipments 1100 (e.g., a keyboard, a pointing equipment, a Bluetooth equipment, etc.), or communicate with one or more equipments enabling the tenant to interact with the electronic equipment 1000, and/or communicate with any equipment (e.g., a router, a modem, etc.) enabling the electronic equipment 1000 to communicate with one or more other computing equipment. Such communication may be carried out via an input/output (I/O) interface 1050. Moreover, the electronic equipment 1000 may further communicate with one or more networks (e.g., a local area network (LAN), a wide area network (WAN), and/or a public network, e.g., the Internet) via a network adapter 1060. The network adapter 1060 may communicate with other modules of the electronic equipment 1000 via the bus 1030. It should be understood that although not shown in the figure, other hardware and/or software modules may be used in conjunction with the electronic equipment 1000, including, but not limited to, microcode, an equipment driver, a redundancy processing unit, an external disk driving array, a RAID system, a tape driver, and a data backup memory system, etc.

Through the descriptions of the embodiments above, those skilled in the art should easily understand that the exemplary embodiments described here may be implemented via software or via a combination of software and necessary hardware. Therefore, the technical solution according to the embodiments of the present disclosure may be embodied in the form of a software product. The software product may be stored in a non-volatile storage medium (which may be a CD-ROM, a U disc, or a mobile hard disk, etc.) or in a network, including a plurality of instructions to cause a computing equipment (which may be a personal computer, a server, or a network equipment etc.) to execute the map building method of a robot according to the embodiments of the present disclosure.

After considering the specification and practicing the disclosures, those skilled in the art will easily envisage other embodiments of the present disclosure. The present application intends to cover any transformation, use or adaptive variation of the present disclosure, and such transformations, uses or adaptive variations follow a general principle of the present disclosure and include the common knowledge or customary technical means in the technical field as undisclosed in the present disclosure. The specification and the embodiments are only regarded as exemplary, and the actual scope and spirit of the present disclosure is pointed out by the appended claims.

What is claimed is:

1. A computer-implemented method, comprising:
    building an initial map according to a scene image captured by a robot at a pose in a work area in response to the robot traversing the work area according to a predetermined rule, wherein the initial map comprises a first map including a mapping of the work area and a map coordinate system, and a second map including the captured scene image, a scene feature extracted from the captured scene image, a geometric quantity of the extracted scene feature and the pose of the robot, and wherein the captured scene image, the scene feature and the geometric quantity are stored in association with the pose of the robot in a scene database, the pose including a coordinate and an orientation of the robot in the work area, and the extracted scene feature including a feature of a feature object in the scene and/or a feature of the scene image;
    determining an estimated pose of the robot from the scene database according to an image captured by the robot in real time;
    determining an accurate pose of the robot according to the image captured by the robot in real time and the estimated pose;
    determining an updated scene image, an updated scene feature and a geometric quantity corresponding to the updated scene feature according to the accurate pose, the scene feature matching the estimated pose, the geometric quantity corresponding to the scene feature and the image captured by the robot in real time; and updating the scene database with the accurate pose, the updated scene image, the updated scene feature, and the geometric quantity corresponding to the updated scene feature.

2. The computer-implemented method according to claim 1, wherein building the initial map according to the scene image captured by the robot comprises:

building a contour map in response to the robot traveling along a boundary of the work area;

building an internal map in response to the robot traveling along a traversal path inside the work area; and obtaining the initial map from the contour map and the internal map.

3. The computer-implemented method according to claim 2, wherein the robot traveling along the boundary of the work area comprises:

by taking a direction in which the robot captures scene images as a positive direction, the robot traveling along the positive direction;

the robot changing from traveling along the positive direction to traveling along the boundary of the obstacle object when identifying an obstacle object.

4. The compute-implemented method according to claim 3, wherein a current position of the robot is determined as a first position when the robot identifies the obstacle object, and wherein the robot travelling along the boundary of the obstacle object further comprises:

when the robot travels to the first position again, the robot determines whether the obstacle object is an obstacle within the work area or the boundary of the work area;

in case the obstacle object is an obstacle in the work area, the robot changes from traveling along the boundary of the obstacle object to traveling in the positive direction;

in case the obstacle object is the boundary of the work area, the robot determines that the boundary of the work area is completely travelled.

5. The computer-implemented method according to claim 1, wherein when the robot traverses the work area according to the predetermined rule and identifies a feature object within the work area according to a captured image, a distance between the robot and the feature object is determined based on a map coordinate system of the first map, and when the distance is consistent with a predetermined distance, the current image captured by the robot in real time is taken as a scene image, and the scene feature is extracted based on the scene image.

6. The computer-implemented method according to claim 1, further comprising:

determining a current pose of the robot based on the initial map or an updated map, and based on the image captured by the robot in real time.

7. The computer-implemented method according to claim 6, wherein determining a current pose of the robot comprises:

matching a scene feature of the image captured in real time by the robot with the scene feature stored in the scene database, and determining a difference between a real-time pose of the robot and the pose of the robot when capturing the scene image according to the comparison of the matched scene feature and the scene feature of the image captured by the robot in real time, so as to determine the current pose of the robot based on the pose of the robot when capturing the scene image.

8. The computer-implemented method according to claim 1, wherein determining the estimated pose of the robot from the scene database according to the image captured by the robot in real time comprises:

extracting a geometric feature set from the image captured by the robot in real time;

searching for image indexes in a scene sub-database according to the extracted geometric feature set; and determining the estimated pose of the robot through an interpolation function, according to the extracted geometric feature set, a geometric feature set corresponding to the image indexes in a geometric information sub-database and poses of the robot corresponding to the image indexes.

9. A robot, comprising:

a motor configured to drive the robot to move;

a processor configured to:

build an initial map according to a scene image captured by the robot at a pose in a work area in response to the robot traversing the work area according to a predetermined rule, wherein the initial map comprises a first map including a mapping of the work area and a map coordinate system, and a second map including the captured scene image, a scene feature extracted from the captured scene image, a geometric quantity of the extracted scene feature and the pose of the robot, and wherein the captured scene image, the scene feature and the geometric quantity are stored in association with the pose of the robot in a scene database, the pose including a coordinate and an orientation of the robot in the work area, and the extracted scene feature including a feature of a feature object in the scene and/or a feature of the scene image;

determine an estimated pose of the robot from the scene database according to an image captured by the robot in real time;

determine an accurate pose of the robot according to the image captured by the robot in real time and the estimated pose;

determine an updated scene image, an updated scene feature and a geometric quantity corresponding to the updated scene feature according to the accurate pose, the scene feature matching the estimated pose, the geometric quantity corresponding to the scene feature and the image captured by the robot in a real time; and update the scene database with the accurate pose, the updated scene image, the updated scene feature, and the geometric quantity corresponding the updated scene feature.

10. The robot according to claim 9, wherein the processor is further configured to determine a current pose of the robot based on the initial map or an updated map, and based on the image captured by the robot in real time.

11. The robot according to claim 10, wherein determining a current pose of the robot comprises:

matching a scene feature of the image captured in real time by the robot with the scene feature stored in the scene database, and determining a difference between a real-time pose of the robot and the pose of the robot when capturing the scene image according to the comparison of the matched scene feature and the scene feature of the image captured by the robot in real time, so as to determine the current pose of the robot based on the pose of the robot when capturing the scene image.

12. The robot according to claim 9, wherein building the initial map according to the scene image captured by the robot comprises:
building a contour map in response to the robot traveling along a boundary of the work area;
building an internal map in response to robot traveling along a traversal path inside the work area; and
obtain initial map from the contour map and the internal map.

13. The robot according to claim 12, wherein the robot traveling along the boundary of the work area comprises:
by taking a direction in which the robot captures scene images as a positive direction, the robot traveling along the positive direction;
the robot changing from traveling along the positive direction to traveling along the boundary of the obstacle object when identifying an obstacle object.

14. The robot according to claim 13,
wherein a current position of the robot is determined as a first position when the robot identifies the obstacle object, and
wherein the robot travelling along the boundary of the obstacle object further comprises:
when the robot travels to the first position again, the robot determines whether the obstacle object is an obstacle within the work area or the boundary of the work area;
in case the obstacle object is an obstacle in the work area, the robot changes from traveling along the boundary of the obstacle object to traveling in the positive direction;
in case the obstacle object is the boundary of the work area, the robot determines that the boundary of the work area is completely travelled.

15. The robot according to claim 9, wherein when the robot traverses the work area according to the predetermined rule and identifies a feature object within the work area according to a captured image, a distance between the robot and the feature object is determined based on a map coordinate system of the first map, and when the distance is consistent with a predetermined distance, the current image captured by the robot in real time is taken as a scene image, and the scene feature is extracted based on the scene image.

16. The robot according to claim 9, wherein determining the estimated pose of the robot from the scene database according to the image captured by the robot in real time comprises:
extracting a geometric feature set from the image captured by the robot in real time;
searching for image indexes in a scene sub-database according to the extracted geometric feature set; and
determining the estimated pose of the robot through an interpolation function, according to the extracted geometric feature set, a geometric feature set corresponding to the image indexes in a geometric information sub-database and poses of the robot corresponding to the image indexes.

17. A non-transitory computer readable storage medium, on which a computer program is stored, wherein the computer program, when executed by a processor, performs the following steps:
building an initial map according to a scene image captured by a robot at a pose in a work area in response to the robot traversing a work area according to a predetermined rule, wherein the initial map comprises a first map including a mapping of the work area and a map coordinate system, and a second map including the captured scene image, a scene feature extracted from the captured scene image, a geometric quantity of the extracted scene feature and the pose of the robot, and wherein the captured scene image, the scene feature and the geometric quantity are a stored in association with the pose of the robot in a scene database, the pose including a coordinate and an orientation of the robot in the work area, and the extracted scene feature including a feature of a feature object in the scene and/or a feature of the scene image;
determining an estimated pose of the robot from the scene database according to an image captured by the robot in real time;
determining an accurate pose of the robot according to the image captured by the robot in real time and the estimated pose;
determining an updated scene image, an updated scene feature and a geometric quantity corresponding to the updated scene feature according to the accurate pose, the scene feature matching the estimated pose, the geometric quantity corresponding to the scene feature and the image captured by the robot in real time; and
updating the scene database with the accurate pose, the updated scene image, the updated scene feature, and the geometric quantity corresponding to the updated scene feature.

18. The storage medium according to claim 17, wherein when the robot traverses the work area according to the predetermined rule and identifies a feature object within the work area according to a captured image, a distance between the robot and the feature object is determined based on a map coordinate system of the first map, and when the distance is consistent with a predetermined distance, the current image captured by the robot in real time is taken as a scene image, and the scene feature is extracted based on the scene image.

19. The storage medium according to claim 17, wherein determining the estimated pose of the robot from the scene database according to the image captured by the robot in real time comprises:
extracting a geometric feature set from the image captured by the robot in real time;
searching for image indexes in a scene sub-database according to the extracted geometric feature set; and
determining the estimated pose of the robot through an interpolation function, according to the extracted geometric feature set, a geometric feature set corresponding to the image indexes in a geometric information sub-database and poses of the robot corresponding to the image indexes.

* * * * *